Nov. 7, 1967   J. B. TOOMEY, JR   3,350,989
PHOTOGRAPHIC CAMERA
Filed May 13, 1965   3 Sheets-Sheet 1

INVENTOR
JOHN B. TOOMEY, JR.

BY Edmund M. Jaskiewicz
ATTORNEY

Nov. 7, 1967  J. B. TOOMEY, JR  3,350,989
PHOTOGRAPHIC CAMERA
Filed May 13, 1965  3 Sheets-Sheet 2
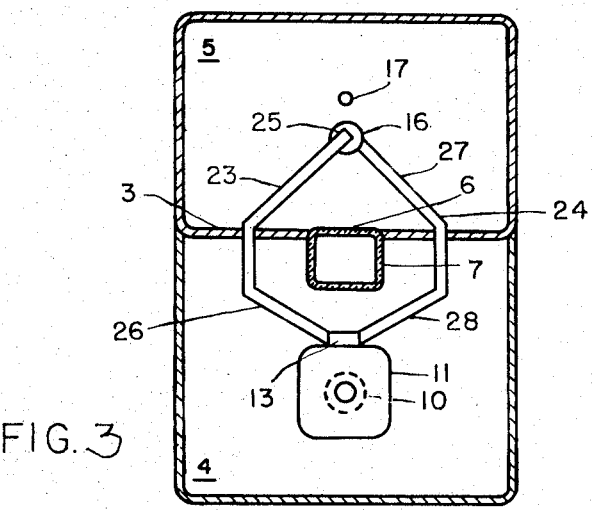
FIG. 3
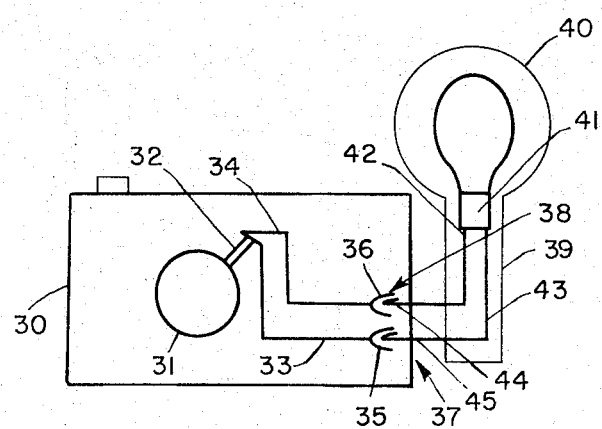
FIG. 5
FIG. 4
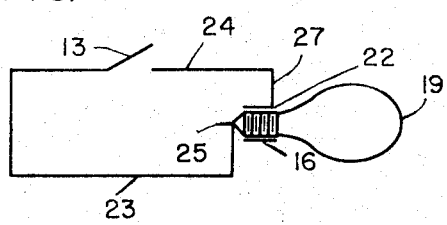
INVENTOR
JOHN B. TOOMEY, JR.
BY *Edmund M. Jaskiewicz*
ATTORNEY Nov. 7, 1967   J. B. TOOMEY, JR   3,350,989
PHOTOGRAPHIC CAMERA
Filed May 13, 1965   3 Sheets-Sheet 3

INVENTOR
JOHN B. TOOMEY, JR.

BY Edmund M. Jaskiewicz
ATTORNEY

United States Patent Office 3,350,989
Patented Nov. 7, 1967

3,350,989
PHOTOGRAPHIC CAMERA
John B. Toomey, Jr., Alexandria, Va., assignor to Value Engineering Company, Alexandria, Va., a corporation of Virginia
Filed May 13, 1965, Ser. No. 455,386
4 Claims. (Cl. 95—11.5)

ABSTRACT OF THE DISCLOSURE

A removable short circuiting element for insertion between the terminals of the battery retaining means of a photographic flash camera when a flash bulb having a self-contained source of electrical energy is positioned in the flash bulb socket.

---

The present invention relates to a photographic camera, more particularly, to such a camera having a flash unit for synchronous operation with the camera, and there being a direct electrical connection between the flash unit and the camera shutter switch since a flash bulb having a source of electrical energy therein is used in the flash unit. No batteries or other sources of electrical energy are required either in the camera or in the flash unit.

Flash photography is generally used to take photographs under adverse light conditions. This is usually accomplished by operating a flash unit in synchronism with the camera. The flash unit may either be an integral component of the camera or may be a unit which is removably attached to the camera. The flash unit includes a photographic flash bulb which comprises a sealed glass envelope having a charge of readily combustible metal foil loosely arranged within the envelope and ignition means extending into the envelope. A power pack to initiate ignition of the bulb may comprise either a battery and condenser unit or a battery alone. Such a power pack may either be built into the flash unit itself or may be employed as a separate component which is electrically connected to both the camera and flash unit. When the shutter release lever of the camera is actuated, the power pack is electrically connected with the flash bulb in synchronism with actuation of the shutter whereupon the bulb is flashed.

Such batteries as power packs are used a number of times but when the flash unit and the electric battery are not used for a long period of time the battery may not generate sufficient electricity and the result would be a badly underexposed photograph. Further, it is extremely difficult for the photographer to determine when the electric battery becomes exhausted since when the battery is tested there may be an indication of current but this current may not be sufficient to ignite the flash bulb. Thus, a conventional camera when employed in flash photography must not only be provided with an external source of electrical energy to ignite the flash bulb but this source of energy must be checked frequently to insure that sufficient electric current will be generated to ignite the flash bulb.

In applicant's copending U.S. patent application filed on March 4, 1965 and having the Serial Number 437,215, there is disclosed a photographic flash bulb which has a self-contained battery in the base thereof which battery is capable of providing sufficient voltage to cause ignition once of the flash bulb. The use of such a photographic flash bulb eliminates the need for a power pack in conjunction with the flash unit of a camera. Accordingly, this improved photographic flash bulb may be used in a camera in which the electrical circuit connecting the flash bulb with a shutter switch does not have any source of electrical energy therein. Since conventional cameras equipped with flash units have mounting structures therein for batteries, it has been deemed desirable to provide an improved camera wherein electrical batteries and the mounts for batteries have been eliminated.

It is therefore the principal object of the present invention to provide a novel and improved photographic camera.

It is another object of the present invention to provide a photographic camera particularly adapted for use with flash bulbs having self-contained sources of electrical energy therein.

It is a further object of the present invention to provide a photographic camera having a flash unit but without any battery or other source of electrical energy in either the camera or flash unit.

It is an additional object of the present invention to provide a photographic camera wherein the electrical connection between the camera shutter switch and the flash bulb socket does not have any source of electrical energy therein.

The photographic camera of the present invention essentially comprises the conventional components for taking a photograph which include a lens, a shutter and a film supporting and moving mechanism. A flash unit is mounted on the top of the camera housing and includes a flash bulb socket for removably retaining a flash bulb therein. The flash bulb is of the type described in the above-mentioned copending application which has a self-contained battery mounted in the base of the bulb. The flash bulb socket is electrically connected to a switch which is actuated in synchronism with the operation of the shutter. The electrical circuit is a permanent electrical connection between the shutter switch and the flash bulb socket in that no other electrical components such as a source of electrical energy or a condenser are in this circuit. The electrical circuit may comprise electrical leads directly connecting the flash bulb socket to the shutter switch.

When a detachable flash unit is employed, the electrical connectors of the flash unit are connected directly to the flash bulb socket by electrical leads. No sources of electrical energy are provided in the flash unit.

In the event photographic flash bulbs having self-contained electrical batteries are used in a conventional flash unit, short circuiting elements are provided for insertion in the battery mountings so as to form electrical connections between the terminals in the circuit.

Other objects and advantages of the present invention will be apparent upon reference to the accompanying description when taken in conjunction with the following drawings wherein:

FIGURE 3 is a sectional view taken along the line 3—3 of FIGURE 2;

FIGURE 4 is an electrical diagram showing schematically the electrical connections between the flash bulb and the shutter switch;

FIGURE 5 is a schematic view showing a flash unit attached to a camera;

Proceeding next to the drawings wherein like reference symbols indicate the same parts throughout the various views a specific embodiment and several modifications of this invention will be described in detail. With particular reference to FIGURES 1 through 4 the photographic camera of the present invention comprises a flash unit constructed integrally with the camera.

Figure 1:
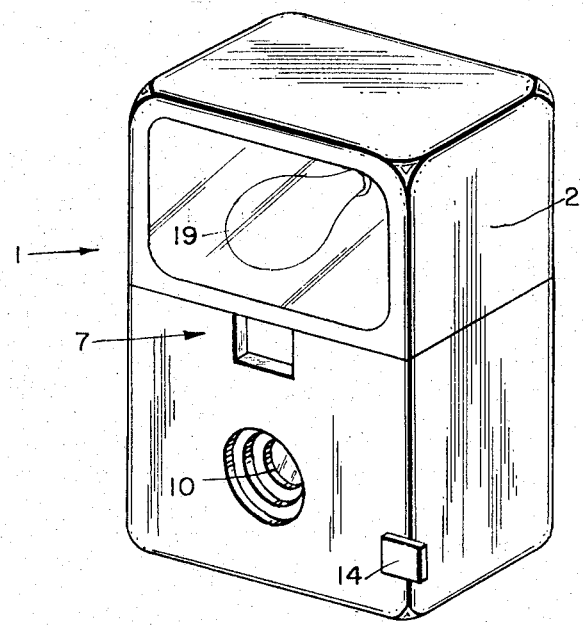
FIGURE 1 is an overall perspective view of the photographic camera of the present invention.

In FIGURE 1 there is illustrated a camera indicated generally at 1 and comprising a housing 2 which is divided by a horizontal partition 3 into a photographic compartment 4 and a flash unit 5. A tubular chamber 6 having a rectangular cross section is positioned between the flash and photographic units to house a view finder 7. The view finder 7 has a lens 8 and an eye piece 9.

The photographic unit comprises a lens 10, a shutter mechanism 11 and a structure indicated at 12 for moving and supporting the film.

Indicated at 13 is a shutter switch which is normally open and is actuated in synchronism with the operation of the shutter. The shutter switch may comprise a movable contact which is closed during that interval of time that the shutter is open to expose the film.

A shutter release lever 14 is provided to actuate the shutter.

The flash unit 5 comprises a reflector 15 at the base of which is provided a socket 16 for a flash bulb. The socket 16 is of the type which removably retains a flash bulb by a spring latch which is released by depression of the button 17. The button 17 actuates a mechanism 18 in the socket 16 for releasing and ejecting the flash bulb from the socket.

A flash bulb 19 having a self-contained source of electrical energy therein as described in the above-mentioned copending application is shown positioned in the socket 16. The flash bulb 19 has a base 20 which is provided with a center terminal or contact 21 and a side terminal or contact 22.

Figure 2:
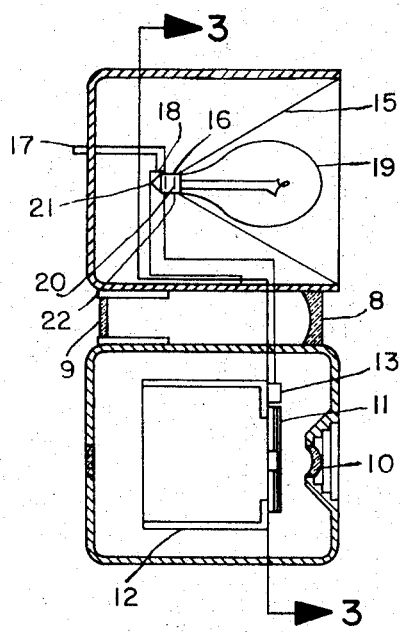
FIGURE 2 is a vertical sectional view of the camera illustrated in FIGURE 1.

The electrical circuit between the flash bulb socket 16 and the shutter switch 13 comprises two terminal strips or members 23 and 24 integrally formed from conductive sheet metal and mounted as illustrated in FIGURES 2 and 3.

The terminal strip 23 has one end 25 positioned over the end of the socket 16 where it is engaged by the center terminal 21 of the flash bulb. The other end 26 of the terminal strip 23 is connected to the shutter switch 13.

The second terminal strip 24 has one end 27 in electrical contact with the socket 16 so as to be engaged electrically with the side terminal 22 of the flash bulb. The other end 28 of the terminal strip 24 is similarly connected to the shutter switch 13.

The photographic flash bulb 19 has a source of electrical energy mounted therein which is electrically connected between the contacts 21 and 22 on the base of the bulb. This source of energy is capable of supply a quantity of electrical energy sufficient for igniting once the substance within the bulb which is adapted to be ignited electrically and burned to radiate actinic light. It is therefore apparent that by closing a circuit across the flash bulb contacts 21 and 22 the electrical energy will be discharged to ignite the flash bulb.

As may be seen in FIGURE 4 the electrical circuit across the flash bulb contacts is closed by the closing of the shutter switch 13 which is actuated by the operation of the shutter. Thus, merely closing the shutter switch ignites the flash bulb. No external source of electrical energy is required either in the camera or flash unit for igniting the flash bulb. As a result, the electrical circuit connecting the shutter switch and the flash bulb consists of the two terminal strips 23 and 24.

The present invention may also be employed in a photographic camera having a detachable flash unit, such as schematically illustrated in FIGURE 5. In FIGURE 5 the camera indicated at 30 is provided with a shutter mechanism 31 and a shutter switch 32. The shutter switch 32 is connected by terminal strips 33 and 34 to the female portions 35 and 36 respectively of the detachable electrical connectors indicated at 37 and 38.

A detachable flash unit is indicated at 39 and may comprise a reflector 40 having a flash bulb socket 41 mounted therein.

The flash bulb socket 41 is electrically connected by terminal strips 42 and 43 to the male components 44 and 45 respectively of the detachable electrical connectors 37 and 38. Prongs or other suitable means may be used to detachably mount the flash unit on the camera.

It is thus apparent that when the flash unit with a flash bulb mounted therein is attached to the camera as shown in FIGURE 5 a direct electrical connection will be formed between the shutter switch 32 and the flash bulb socket 41. Closing of the shutter switch 32 in synchronism with the operation of the shutter 31 will close the electrical circuits across the contacts of the flash bulb and cause the flash bulb to be ignited.

Figure 6:
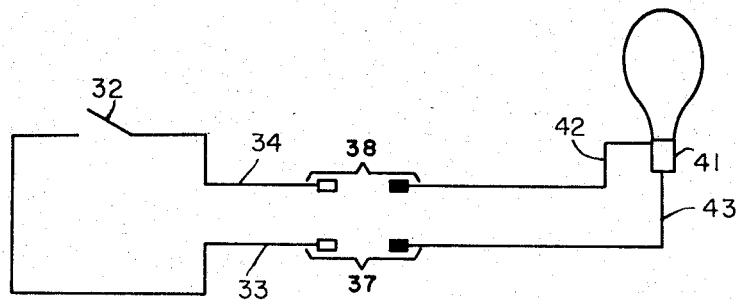
FIGURE 6 is an electrical diagram showing schematically the electrical connections between the flash bulb and shutter switch in the photographic apparatus of FIGURE 5.

The electrical connection for the photographic apparatus of FIGURE 5 is illustrated schematically in FIGURE 6.

Proceeding next to FIGURES 7 and 8 there will be described an arrangement for modifying a conventional battery power-pack flash unit whereby the flash unit can be utilized with photographic flash bulbs having internal batteries therein.

Figure 7:
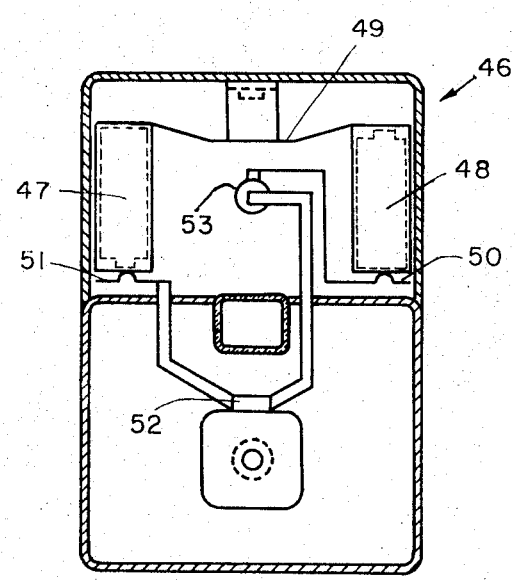
FIGURE 7 is a sectional view similar to that of FIGURE 3 but showing a flash bulb unit having structure for mounting electric batteries in the unit.

The camera illustrated at 46 in FIGURE 7 has battery recesses 47 and 48 into which batteries are inserted as indicated by the dotted lines. The battery terminals are in electrical contact with terminal strips 49, 50, and 51 which are connected electrically to the shutter switch 52 and the flash bulb socket 53.

Figure 8:
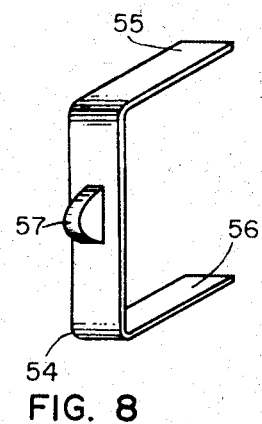
FIGURE 8 is an overall perspective view of the short circuiting element which can be inserted in the battery mounting structure of FIGURE 7 so that the photographic apparatus illustrated therein may operate without electric batteries.

In order to employ this type of camera without electric batteries a short circuit element as illustrated in FIGURE 8 and indicated at 54 may be inserted in the battery recessess 47 and 48. The arms 55 and 56 of the short circuiting elements engage the terminal strips and thus provide a continuous electric circuit between the flash bulb socket and shutter switch.

For convenience in handling, the short circuiting element 54 is provided with a handle 57 of electrically insulating material.

With short circuiting elements 54 in position as described above, the resulting electrical circuit will be the equivalent of the circuit illustrated in FIGURE 4 and will operate in the same manner.

Thus it can be seen that the present invention has disclosed a camera which is particularly adapted for use with photographic flash bulbs having internal batteries therein. The flash unit of such a camera has a direct electrical connection between the flash bulb and the shutter switch and there are no sources of electrical energy in these electrical circuits. The resulting camera is considerably lighter in weight and simpler in construction. Further, the entire flash unit may be sealed in the cabinet housing since access to the flash unit is not required. The present camera and flash bulb also eliminates the necessity of constantly checking the electric batteries in order to determine whether or not they will generate sufficient electrical energy to ignite the flash bulb.

It will be understood that this invention is susceptible to modification in order to adapt it to different usages and conditions and, accordingly, it is desired to comprehend such modifications within this invention as may fall within the scope of the appended claims.

What is claimed is:

1. In a photographic flash camera, a housing having a shutter mechanism therein, a shutter switch responsive to the operation of said shutter mechanism to be actuated in synchronism therewith, a flash bulb socket carried by said housing, a flash bulb having a self-contained source of electrical energy therein received within said socket, means within said housing for retaining a source of potential and having terminal means electrically engageable with the electrodes of the potential source, electrical circuit means connecting said shutter switch, said terminal means and said socket, and removable means positioned between said terminal means to provide an electrical connection therebetween without a source of potential in said retaining means whereby the closing of said shutter switch in response to said shutter mechanism will close the electrical circuit and cause the ignition of said flash bulb.

2. In a photographic flash camera as claimed in claim 1 with said removable means comprising a strip of electrically conductive material.

3. In a photographic flash camera as claimed in claim 2 with said strip having arms at the ends thereof for engagement with said terminal means when said strip is positioned in said retaining means.

4. In a photographic flash camera as claimed in claim 3 with said strip having a handle thereon of electrically insulating material.

References Cited
UNITED STATES PATENTS

| | | | |
|---|---|---|---|
| 2,191,402 | 2/1940 | Saffir et al. | 95—11.5 |
| 2,723,549 | 11/1955 | Martin | 67—31 |
| 2,744,188 | 5/1956 | Olsen et al. | 240—10.63 |
| 2,848,598 | 8/1958 | Amlee | 240—10.63 |
| 2,872,857 | 2/1959 | Rich et al. | 95—11.5 |
| 3,001,461 | 9/1961 | Irwin | 95—11.5 |
| 3,139,805 | 7/1964 | Peterson | 95—11.5 |

NORTON ANSHER, *Primary Examiner.*

FRED BRAUN, *Assistant Examiner.*